(12) United States Patent
Wang

(10) Patent No.: US 11,719,271 B2
(45) Date of Patent: Aug. 8, 2023

(54) FASTENER STRUCTURE

(71) Applicant: FIVETECH TECHNOLOGY INC., New Taipei (TW)

(72) Inventor: Ting-Jui Wang, New Taipei (TW)

(73) Assignee: FIVETECH TECHNOLOGY INC., New Taipei (TW)

( * ) Notice: Subject to any disclaimer, the term of this patent is extended or adjusted under 35 U.S.C. 154(b) by 384 days.

(21) Appl. No.: 16/944,175

(22) Filed: Jul. 31, 2020

(65) Prior Publication Data
US 2021/0040973 A1 Feb. 11, 2021

(30) Foreign Application Priority Data
Aug. 7, 2019 (TW) .................................. 108128161

(51) Int. Cl.
*F16B 21/09* (2006.01)
*F16B 21/08* (2006.01)
*F16B 5/06* (2006.01)
*F16B 19/10* (2006.01)

(52) U.S. Cl.
CPC ............ *F16B 19/109* (2013.01); *F16B 21/09* (2013.01); *F16B 5/0664* (2013.01); *F16B 21/08* (2013.01); *F16B 2200/506* (2018.08)

(58) Field of Classification Search
CPC ........ F16B 21/08; F16B 21/09; F16B 5/0642; F16B 5/0664; F16B 7/105; F16B 19/02; Y10T 403/32524; Y10T 403/32483
See application file for complete search history.

(56) References Cited

U.S. PATENT DOCUMENTS

| | | | | |
|---|---|---|---|---|
| 1,340,387 | A * | 5/1920 | Emmert | B60R 13/105 |
| | | | | 411/350 |
| 1,403,655 | A * | 1/1922 | Tirrill | F16B 5/0642 |
| | | | | 411/350 |
| 1,907,210 | A * | 5/1933 | Matson | F16M 11/245 |
| | | | | 403/109.8 |
| 2,640,246 | A * | 6/1953 | Shomber | F16B 21/09 |
| | | | | 411/401 |
| 3,337,245 | A * | 8/1967 | Prange | B66D 1/16 |
| | | | | 192/69.63 |
| 3,397,000 | A * | 8/1968 | Nakanishi | E05B 65/0864 |
| | | | | 292/61 |

(Continued)

FOREIGN PATENT DOCUMENTS

| | | |
|---|---|---|
| CN | 203585042 U | 5/2014 |
| CN | 106256978 A | 12/2016 |

(Continued)

*Primary Examiner* — Flemming Saether

(57) ABSTRACT

A fastener structure includes a head portion, a body portion and an elastic element. The head portion has a shaft section, a press section and a hold-down section. The body portion has a corresponding press section, which is movably assembled to the press section. The elastic element has an end pressed against the press section and another end against the body section, allowing the head portion to move elastically. The body portion can be engaged with an object, and the hold-down section of the head portion can elastically hold down a workpiece against the object or be elastically removed from the workpiece, so as to complete the connection and disconnection of at least two objects to and from one another in a quick and repeatable manner.

16 Claims, 17 Drawing Sheets

(56) References Cited

U.S. PATENT DOCUMENTS

| | | | | |
|---|---|---|---|---|
| 8,926,479 B2* | 1/2015 | Chen | ................... | A63B 22/02 |
| | | | | 292/137 |
| 10,319,413 B2* | 6/2019 | Wang | ................... | G11B 33/08 |
| 2007/0003361 A1* | 1/2007 | Wang | ................... | F16B 7/105 |
| | | | | 403/109.3 |

FOREIGN PATENT DOCUMENTS

| | | |
|---|---|---|
| TW | M326971 U | 2/2008 |
| TW | M517265 U | 2/2016 |
| TW | M518289 U | 3/2016 |
| TW | I638950 B | 10/2018 |
| TW | M575482 U | 3/2019 |
| TW | M582080 U | 8/2019 |
| TW | M582087 U | 8/2019 |
| TW | 202018197 A | 5/2020 |

* cited by examiner

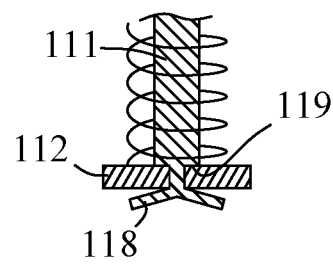
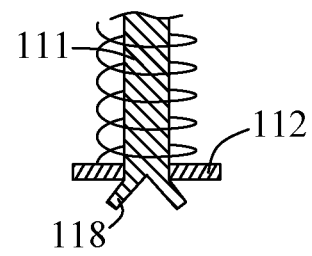
FIG.12  FIG.13
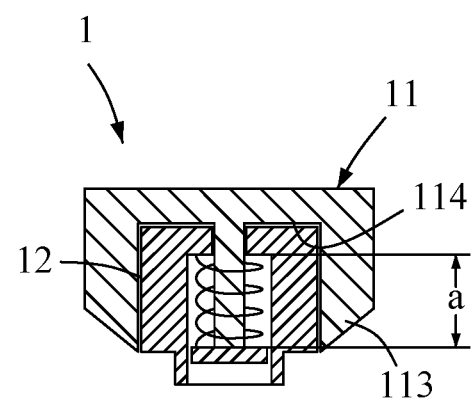
FIG.14

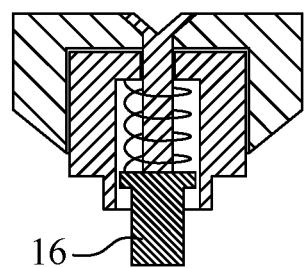
FIG.17
16
  
(a)　　　(b)　　　(c)
FIG.18

FASTENER STRUCTURE

CROSS-REFERENCE TO RELATED APPLICATION

This non-provisional application claims priority under 35 U.S.C. § 119(a) on Patent Application No(s). 108128161 filed in Taiwan, R.O.C. on Aug. 7, 2019, the entire contents of which are hereby incorporated by reference.

BACKGROUND OF THE INVENTION

1. Field of the Invention

The present disclosure relates to a fastener structure, and in particular to a fastener structure that enables at least two objects to be connected to and disconnected from one another in a quick and repeatable manner.

2. Description of the Related Art

Generally, screws are used to fasten at least one object, so that objects can be connected to one another.

While the above way that has long been used to fasten at least one object can indeed hold the object in place without being separated easily, the object might, however, be subjected to an unstable state after being assembled to another object.

BRIEF SUMMARY OF THE INVENTION

An objective of the present disclosure is to provide a fastener structure, which has a body portion for engaging with an object and a head portion having a hold-down section for elastically holding down or releasing a workpiece, so that at least two objects, i.e. the workpiece and the object, can be connected to or disconnected from one another in a quick and repeatable manner.

To achieve at least the above objective, an embodiment of the fastener structure according to the present disclosure includes a head portion, a body portion and an elastic element. The head portion has a shaft section, a press section and a hold-down section; the body portion has a corresponding press section, which is movably assembled to the press section; and the elastic element has an end pressed against the press section and another end pressed against the body portion, allowing the head portion to move elastically.

In another embodiment, the fastener structure includes a head portion, a body portion and an elastic element. The head portion has a shaft section, which has a press section; the body portion has a corresponding press section, which is movably assembled to the press section; and the elastic element has an end pressed against the press section and another end pressed against the body portion, allowing the head portion to move elastically.

With the above arrangements, the body portion can be engaged with an object, and the hold-down section of the head portion can be elastically held down against or removed from a workpiece, so that at least two objects, i.e. the object and the workpiece, can be connected to and disconnected from one another in a quick and repeatable manner.

Optionally, the head portion internally defines a receiving section and the body portion is received in the receiving section to reduce an overall height of the fastener structure.

Optionally, the hold-down section can have a guiding section for guiding or pushing the head portion to a narrowed lock section on the workpiece.

Optionally, the guiding section of the hold-down section can be a slant surface, a cambered surface, a curved surface, a stepped section or a hierarchical section.

Optionally, the hold-down section can be a slant surface, a cambered surface, a curved surface, or a stepped section for elastically abutting on the narrowed locking section to thereby hold down the workpiece, or for moving to the narrowed locking section and then further to an expanded locking section of the workpiece to abut on the expanded locking section and elastically hold down the workpiece.

The hold-down section has a width larger than that of the narrowed locking section on the workpiece, and the body portion has a width smaller than that of the narrowed locking section, such that the body portion is located below the narrowed locking section while the hold-down section is moved to a top of the narrowed locking section to hold down the workpiece.

Or, the hold-down section has a width larger than that of the narrowed locking section on the workpiece, and the body portion has a width smaller than that of the narrowed locking section, such that the body portion is located below the narrowed locking section while the hold-down section is first moved to a top of the narrowed locking section and then further moved to the expanded locking section to hold down the workpiece.

Optionally, the hold-down section functions as a holding and limiting section, which first passes through the top of the narrowed locking section and then moves into the expanded locking section, so that the hold-down section is elastically pushed against the expanded locking section to hold down the workpiece.

Optionally, the body portion has an engaging section for engaging with the object.

Optionally, the shaft section has a lower coupling section for upward abutting against the press section.

Optionally, the press section is firstly fitted around the shaft section and then, a force is applied to a free end of the shaft section using a mold, so that the free end of the shaft section is deformed to form the lower coupling section for upwardly abutting against the press section, so that the press section is assembled to the shaft section.

Optionally, the shaft section has a shoulder section or a stepped section, so that the press section is assembled to the shaft section and limited to between the shoulder section and the lower coupling section, or the press section is elastically movable on the lower coupling section.

Optionally, the press section is provided with a through opening, via which the shaft section is extended to assemble to the press section Optionally, the hold-down section has a guiding section, which can be moved to the expanded or the narrowed locking section on the workpiece while applies a force against the expanded or the narrowed locking section, so that the head portion is lifted to separate from the expanded or the narrowed locking section and can be easily moved to a top of the narrowed locking section or be detached from the workpiece, respectively.

Optionally, the head portion internally defines a receiving section and the body portion is received in the receiving section to reduce an overall height of the fastener structure; and the hold-down section is externally located around the head portion and has a height close to that of the receiving section to also reduce the overall height of the fastener structure.

Optionally, an external force can be applied to the free end of the shaft section, so that the free end is flared by driven riveting to form the press section. Alternatively, an external force can be applied to the free end of the shaft section, so that the free end is flared by driven riveting to form a stop structure, which upwardly abuts against the press section.

Optionally, the shaft section has a top press section, which can be extended through the head portion, so as to assemble to the head portion and the body portion.

Optionally, the elastic element has one end pressed against the press section and another end pressed against the corresponding press section of the body portion, such that the elastic movement of the head portion brings the shaft section to elastically move in the body portion.

Optionally, the press section and the shaft section are integrally formed. Alternatively, the shaft section has a connecting section, at where an external force can be applied, so that the connecting section is flared by driven riveting to thereby connect to the head portion.

Optionally, the top press section of the shaft section has a countersunk head and the head portion has a sunken recess shaped corresponding to that of the countersunk head of the top press section, such that the countersunk head of the top press section can be fitly set in the sunken recess to reduce an overall height of the head portion.

Optionally, the shaft section has a top press section and the head portion is provided with a through hole, and the top press section is limited to the through hole while the shaft section is turnable, rotatable, upward and downward movable, or sidewardly movable in the through hole.

Optionally, the shaft section has a top press section and the head portion has a through hole, and the top press section is limited to the through hole while the shaft section is movable in the through hole.

Optionally, the shaft section has a fastening section.

Optionally, the head portion, the shaft section and the body portion are assembled to one another by extending the shaft section through the head portion and the body portion, either from top to bottom or from bottom to top, so that the elastic element, the head portion and the body portion are limited to between a top press section and the press section of the shaft section.

Optionally, the head portion, the shaft section and the body portion are assembled to one another by extending the shaft section through a through hole formed on the head portion and a through hole formed on the body portion, so that the elastic element, the head portion and the body portion are limited to between the top press section and the press section of the shaft section.

Optionally, the head portion, the shaft section and the body portion are assembled to one another by extending the shaft section through the through hole formed on the head portion and the through hole formed on the body portion, so that the elastic element, the head portion and the body portion are limited to between the top press section and the press section of the shaft section; and the top press section is limited to the through hole of the head portion while the shaft section is turnable, rotatable, upward and downward movable, or sidewardly movable in the through hole of the head portion and the through hole of the body portion.

Optionally, the head portion, the shaft section and the body portion are assembled to one another by extending the shaft section through the through hole formed on the head portion and the through hole formed on the body portion, either from top to bottom or from bottom to top, so that the elastic element, the head portion and the body portion are limited to between the top press section and the press section of the shaft section; and that the top press section is limited to the through hole of the head portion while the shaft section is movable in the through hole of the head portion and the through hole of the body portion.

Optionally, the head portion, the shaft section and the body portion are assembled to one another by extending the shaft section through the through hole formed on the head portion and the through hole formed on the body portion, so that the elastic element, the head portion and the body portion are limited to between the top press section and the press section of the shaft section; and a first floating space is left between the top press section and the head portion, a second floating space is left between the shaft section and the through hole of the head portion, a third floating space is left between the shaft section and the through hole of the body portion, a fourth floating space is left between the shaft section and the press section, or a fifth floating space is left between the press section and the stop structure of the shaft section.

Optionally, the floating spaces are respectively ranged between 0.00001 mm and 100 mm.

Optionally, the shaft section has a stop structure to upward abut against the press section.

Optionally, the fastening section can be in the form of a straight column, a male fastening element, a female fastening element, an externally threaded stem, or an elastic fastening element.

Optionally, the hold-down section has a guiding section, which is able to apply a force against the workpiece to thereby lift the head portion for the same to move to a top of a narrowed locking section formed on the workpiece.

Optionally, the body portion has an engaging section provided with a weldable layer. When the fastener structure is picked up from a carrier and placed on an object by a tool, the weldable layer is welded to the object to thereby connect the body portion to the object.

BRIEF DESCRIPTION OF THE DRAWINGS

The structure and the technical means adopted by the present disclosure to achieve the above and other objects can be best understood by referring to the following detailed description of the preferred embodiments and the accompanying drawings. To a person having ordinary skill in the art, other useful drawings can be obtained based on the accompanying drawings without taking too much creative effort.

FIG. 12 shows the assembling of a tenth embodiment of the fastener structure according to the present disclosure.

FIG. 13 shows the assembling of an eleventh embodiment of the fastener structure according to the present disclosure.

FIG. 14 is a sectional view of a twelfth embodiment of the fastener structure according to the present disclosure.

FIG. 17 is a sectional view of a fifteenth embodiment of the fastener structure according to the present disclosure.

FIG. 18 shows other possible configurations for a fastening section included in the fastener structure in the fifteenth embodiment thereof.

DETAILED DESCRIPTION OF THE INVENTION

To facilitate understanding of the objects, characteristics and effects of this present disclosure, embodiments together with the attached drawings for the detailed description of the present disclosure are provided. It is noted the present disclosure can be implemented or applied in other embodiments, and many changes and modifications in the described embodiments can be carried out without departing from the spirit of the disclosure, and it is also understood that the preferred embodiments are only illustrative and not intended to limit the present disclosure in any way.

Figure 1:
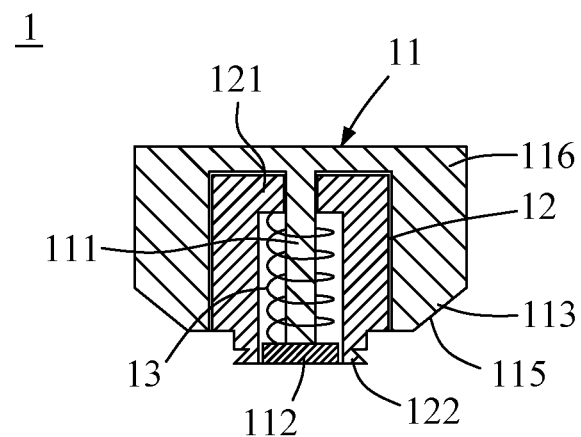
FIG. 1 is a sectional view showing a first embodiment of the fastener structure according to the present disclosure.
Figure 2:
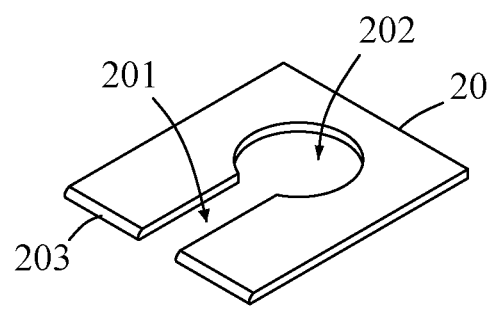
FIG. 2 is a perspective view of a workpiece that is to be fastened to an object using the fastener structure of the present disclosure.
Figure 3:
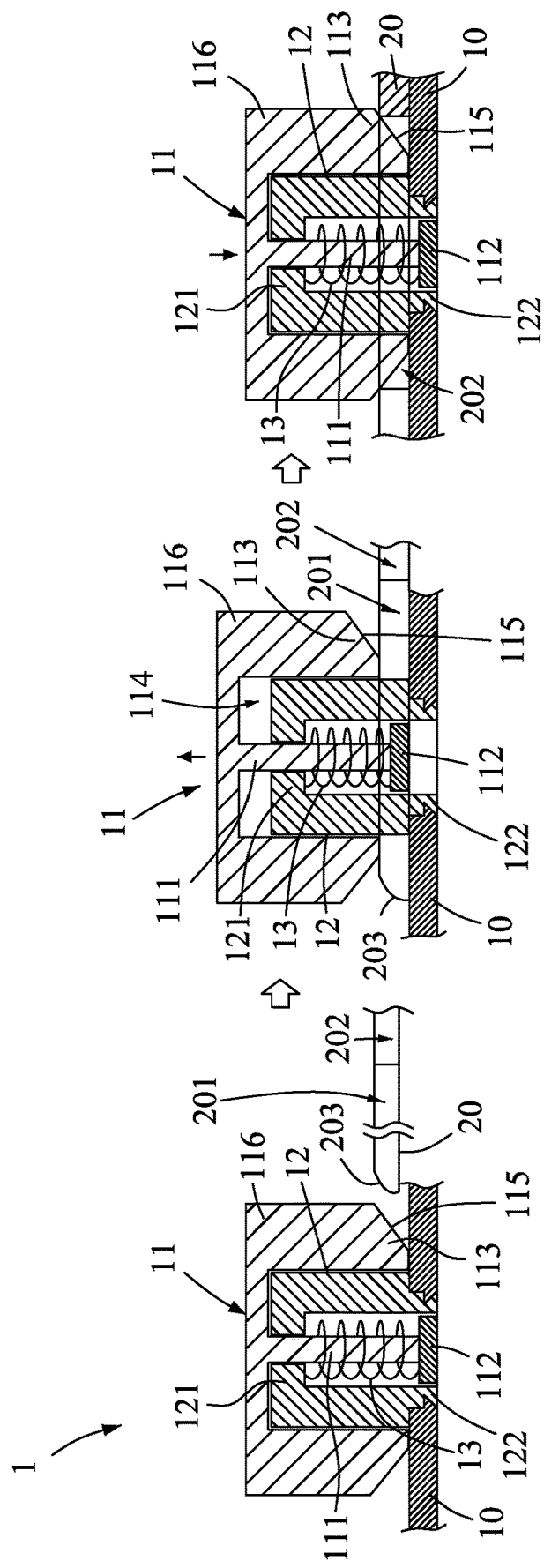
FIG. 3 shows the use of the first embodiment of the fastener structure to fasten the workpiece of FIG. 2 to an object.

Please refer to FIGS. 1 to 3, which show a first embodiment of a fastener structure 1 according to the present disclosure for fastening a workpiece 20 (see FIG. 2) to an object 10. In the first embodiment, the fastener structure 1 includes a head portion 11, a body portion 12 and an elastic element 13.

The head portion 11 has a shaft section 111, a press section 112 and a hold-down section 113. Or, in an operable embodiment, the head portion 11 can only has the shaft section 111 and the press section 112 without the hold-down section 113.

The body portion 12 has a corresponding press section 121. The press section 112 and the corresponding press section 121 are movably assembled to each other.

The elastic element 13 has an end pressed against the press section 112 and another end against the body portion 12, such that the head portion 11 is elastically movable.

When using the fastener structure 1 in the first embodiment, first connect the body portion 12 to an object 10 and the hold-down section 113 of the head portion 11 is moved to a narrowed locking section 201 on the workpiece 20. At this point, the elastic element 13 is compressed. Then, further move the hold-down section 113 to an expanded locking section 202 on the workpiece 20 located behind the narrowed locking section 201. At this point, the elastic element 13 is no longer compressed and the hold-down section 113 of the head portion 11 is brought by the decompressed elastic element 13 to elastically hold down the workpiece 20 against the object 10. When it is desired to remove the workpiece 20 from the object 10, simply pull the head portion 11 for the hold-down section 113 to move away from the expanded locking section 202. At this point, the elastic element 13 is compressed again. Thereafter, move the workpiece 20 in a direction away from the fastener structure 1. At this point, the elastic element 13 is released and the head portion 11 is elastically restored to its initial position and ready for use next time. In this way, the hold-down section 113 of the head portion 11 can elastically hold down the workpiece 20 or be removed from the workpiece 20, enabling at least two objects to be connected to and disconnected from one another in a quick and repeatable manner.

In the first embodiment, the body portion 12 also has an engaging section 122, via which the body portion 12 is firmly connected to the object 10 to facilitate subsequent pressing of the head portion 11 against the workpiece 20.

In the first embodiment, the head portion 11 internally defines a receiving section 114 for receiving the body portion 12 therein. In this way, the fastener structure 1 can have a reduced overall height to satisfy the requirements in actual use.

In the first embodiment, the hold-down section 113 can be a slant surface, a cambered surface, a curved surface or a stepped surface. The hold-down section 113 is firstly moved to the narrowed locking section 201 on the workpiece 20 and then further moved to the expanded locking section 202 on the workpiece 20 to be elastically held down thereto. Thus, the head portion 11 elastically holds down the workpiece 20 via the hold-down section 113 to complete the connection of at least two objects to one another.

In the first embodiment, the hold-down section 113 has a width larger than that of the narrowed locking section 201 on the workpiece 20; and the body portion 12 has a width smaller than that of the narrowed locking section 201. With this design, the hold-down section 113 will first be moved onto the narrowed locking section 201 and then into the expanded locking section 202. In this way, the head portion 11 can elastically hold down the workpiece 20 via the hold-down section 113 to complete the connection of at least two objects.

In the first embodiment, the hold-down section 113 has a guiding section 115, which can be a slant surface, a cambered surface, a curved surface, a stepped surface, or a hierarchical section. In the illustrated embodiments of the present disclosure, the guiding section 115 is a slant surface. The slant guiding surface 115 guides and pushes the head portion 11 onto the narrowed locking section 201 and then into the expanded locking section 202 on the workpiece 20. On the other hand, the slant surface of the guiding section 115 in the expanded locking section 202 can apply a force against the workpiece 20 to thereby lift the head portion 11, so that the hold-down section 113 is separated from the expanded locking section 202 and the narrowed locking section 201 sequentially to finally detach from the workpiece 20. In this way, at least two objects can be disconnected from one another.

In the first embodiment, the workpiece 20 has a corresponding guiding section 203, which can be forward pushed to contact with the hold-down section 113. The corresponding guiding section 203 can be a slant surface, a cambered surface, a curved surface, a stepped surface or a flat surface. In the illustrated embodiments of the present disclosure, the corresponding guiding section 203 is a cambered surface. When fastening the workpiece 20 to the object 10 using the fastener structure 1, simply push the corresponding guiding section 203 of the workpiece 20 against the guiding section 115, so that the hold-down section 113 of the head portion 11 is elastically moved onto the narrowed locking section 201 on the workpiece 20 while the elastic element 13 is compressed at the same time. Then, the hold-down section 113 is further moved into the expanded locking section 202 on the workpiece 20. At this point, the elastic element 13 is decompressed to elastically push the head portion 11 downward, causing the hold-down section 113 to elastically hold down the workpiece 20 against the object 10. In this way, the connection of at least two objects to one another is completed.

In the first embodiment, the head portion 11 further has a handling section 116. When it is desired to remove the workpiece 20 from the object 10, simply pull the head portion 11 at the handling section 116 for the hold-down section 113 to move out of the expanded locking section 202 to compress the elastic element 13 at the same time. Then, move the workpiece 20 in a direction away from the hold-down section 113. At this point, the elastic element 13 is released and the head portion 11 is elastically restored to its initial position and ready for use next time. In this way, the hold-down section 113 of the head portion 11 elastically pushed against the workpiece 20 can be detached from the workpiece 20, enabling the disconnection of at least two objects from one another.

In the first embodiment, the elastic element 13 has one end pressed against the press section 112 and the other end against the corresponding press section 121 of the body portion 12. Whereby, when the head portion 11 is elastically moved, it brings the shaft section 111 to move simultaneously in the body portion 12 to compress the elastic element 13 or to decompress the elastic element 13, so that the head portion 11 is elastically restored to its initial position and ready for use next time.

In the first embodiment, the shaft section 111 and the head portion 11 can be produced by movably assembling to each other, fixedly assembling to each other, combined forming, or integral forming, so that the fastener structure 1 of the present disclosure can satisfy different requirements in different applications.

Figure 4:
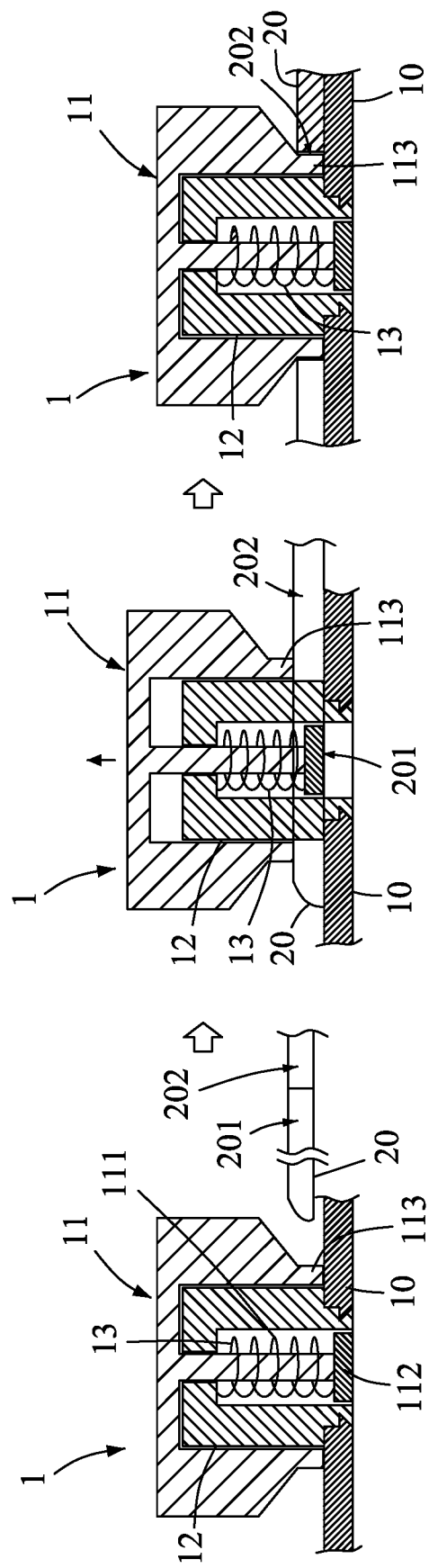
FIG. 4 shows the use of a second embodiment of the fastener structure to fasten the workpiece of FIG. 2 to an object.

Please refer to FIG. 4, which shows a second embodiment of the fastener structure 1 and the use thereof. In the second embodiment, the hold-down section 113 functions as a holding and limiting section. After passing through a top of the narrowed locking section 201 on the workpiece 20 and compressing the elastic element 13, the hold-down section 113 is further moved into the expanded locking section 202 on the workpiece 20. At this point, the elastic element 13 is released to push the hold-down section 113 against the expanded locking section 202 and limit it thereto, so that the hold-down section 113 elastically holds down the workpiece 20 against the object 10. When it is desired to remove the workpiece 20 from the object 10, just pull the head portion 11 upward for the hold-down section 113 to move out of the expanded locking section 202. At this point, the elastic element 13 is compressed and the workpiece 20 can be moved reversely. After the workpiece 20 is removed away, the elastic element 13 is released to thereby elastically restore the head portion 11 to its initial position and ready for use next time. In this way, the hold-down section 113 of the head portion 11 can elastically hold down or be removed from the workpiece 20 to complete the connection and disconnection of at least two objects, i.e. the object 10 and the workpiece 20, to and from one another in a quick and repeatable manner.

Figure 5:
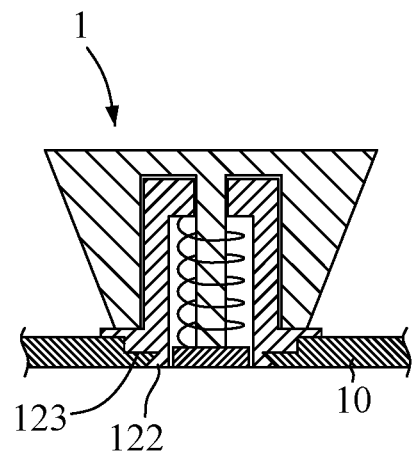
FIG. 5 shows the use of a third embodiment of the fastener structure according to the present disclosure.

Please refer to FIG. 5, which shows the use of a third embodiment of the fastener structure 1 according to the present disclosure. In the third embodiment, the engaging section 122 of the fastener structure 1 is provided with a material filling section 123. When a force is applied to the fastener structure 1 to press it against the object 10, a part of the material of the object 10 is forced to flow or enter into the material filling section 123, so that the fastener structure 1 is connected to the object 10. In this way, the body portion 12 of the fastener structure 1 can be firmly connected to the object 10 at the material filling section 123 to facilitate subsequent fastening of the head portion 11 to the workpiece (not shown in FIG. 5).

Figure 6:
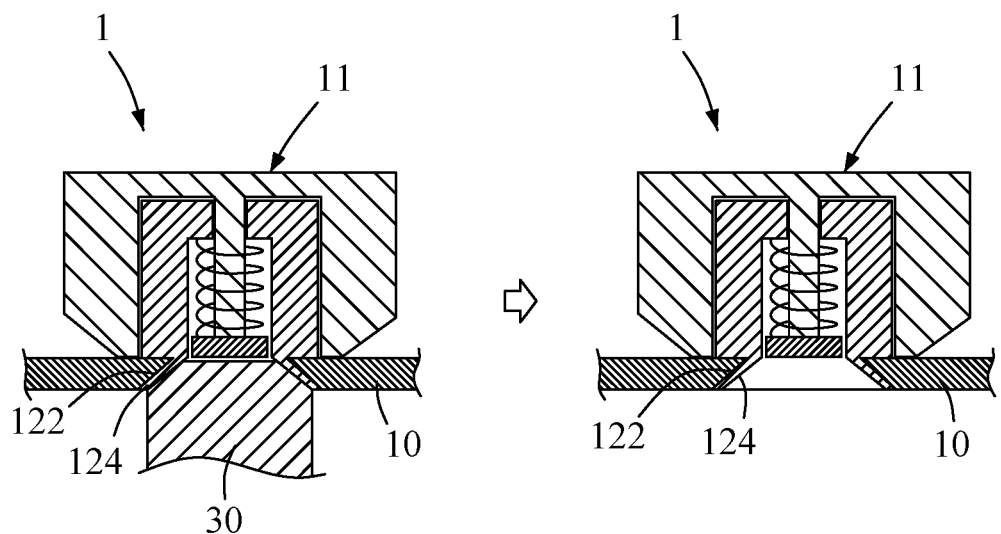
FIG. 6 shows the use of a fourth embodiment of the fastener structure according to the present disclosure.

Please refer to FIG. 6, which shows the use of a fourth embodiment of the fastener structure 1 according to the present disclosure. In the fourth embodiment, the engaging section 122 of the fastener structure 1 is provided with an expansion connection section 124. When a force is applied by a tool or a mold 30 to the expansion connection section 124, the expansion connection section 124 is outward expanded to firmly abut against the object 10. In this way, the body portion 12 of the fastener structure 1 can be firmly connected to the object 10 at the expansion connection section 124 to facilitate subsequent fastening of the head portion 11 to the workpiece (not shown in FIG. 5).

Figure 7:
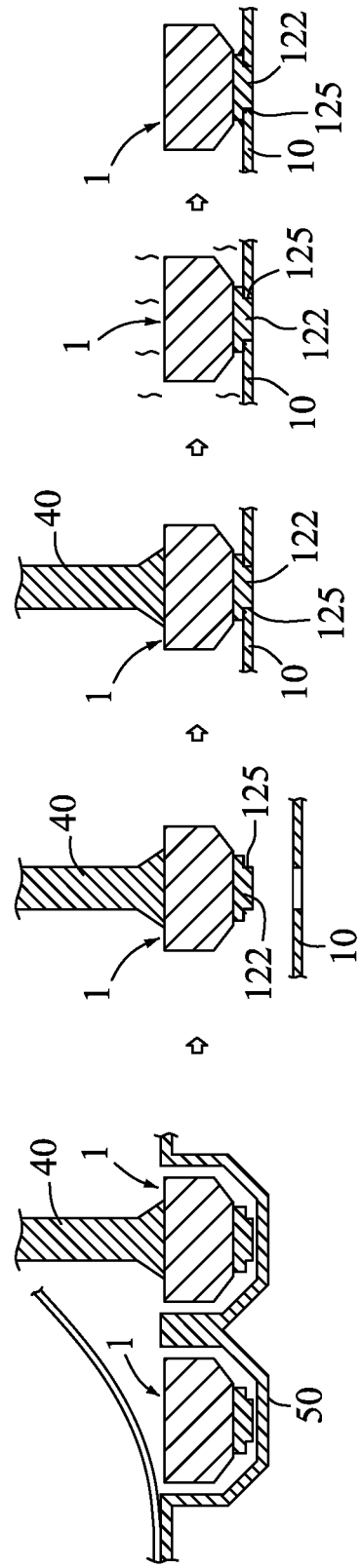
FIG. 7 shows the use of a fifth embodiment of the fastener structure according to the present disclosure.

Please refer to FIG. 7, which shows the use of a fifth embodiment of the fastener structure 1 according to the present disclosure. In the fifth embodiment, engaging section 122 of the fastener structure 1 is provided with a weldable layer 125. When the fastener structure 1 is picked up from a carrier 50 and placed on the object 10 by a tool 40, the weldable layer 125 can be welded to the object 10 to thereby connect the fastener structure 1 to the object 10.

Figure 8:
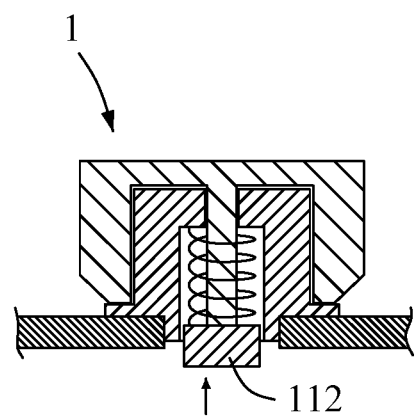
FIG. 8 is a sectional view of a sixth embodiment of the fastener structure according to the present disclosure.

Please refer to FIG. 8, which is a sectional view of a sixth embodiment of the fastener structure 1 according to the present disclosure. In the sixth embodiment, the press section 112 of the fastener structure 1 can be an operating section. By operating the press section 112, the head portion 11 can be driven to move. With this arrangement, the fastener structure 1 of the present disclosure is more practical for use to meet the requirements in different applications.

Figure 9:
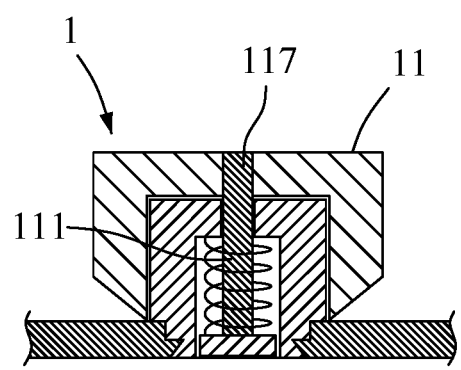
FIG. 9 is a sectional view of a seventh embodiment of the fastener structure according to the present disclosure.

Please refer to FIG. 9, which is a sectional view of a seventh embodiment of the fastener structure 1 according to the present disclosure. In the seventh embodiment, the shaft section 111 of the fastener structure 1 has an upper coupling section 117, at where the shaft 111 is coupled to the head portion 11. To assemble the head portion 11 and the shaft section 111, simply extend the upper coupling section 117 into the head portion 11 and the shaft section 111 is coupled to the head portion 11. Or, according to the requirements in different use conditions, the head portion 11 may be assembled to the shaft section 111 by fitting the head portion 11 onto the upper coupling section 117.

Figure 10:
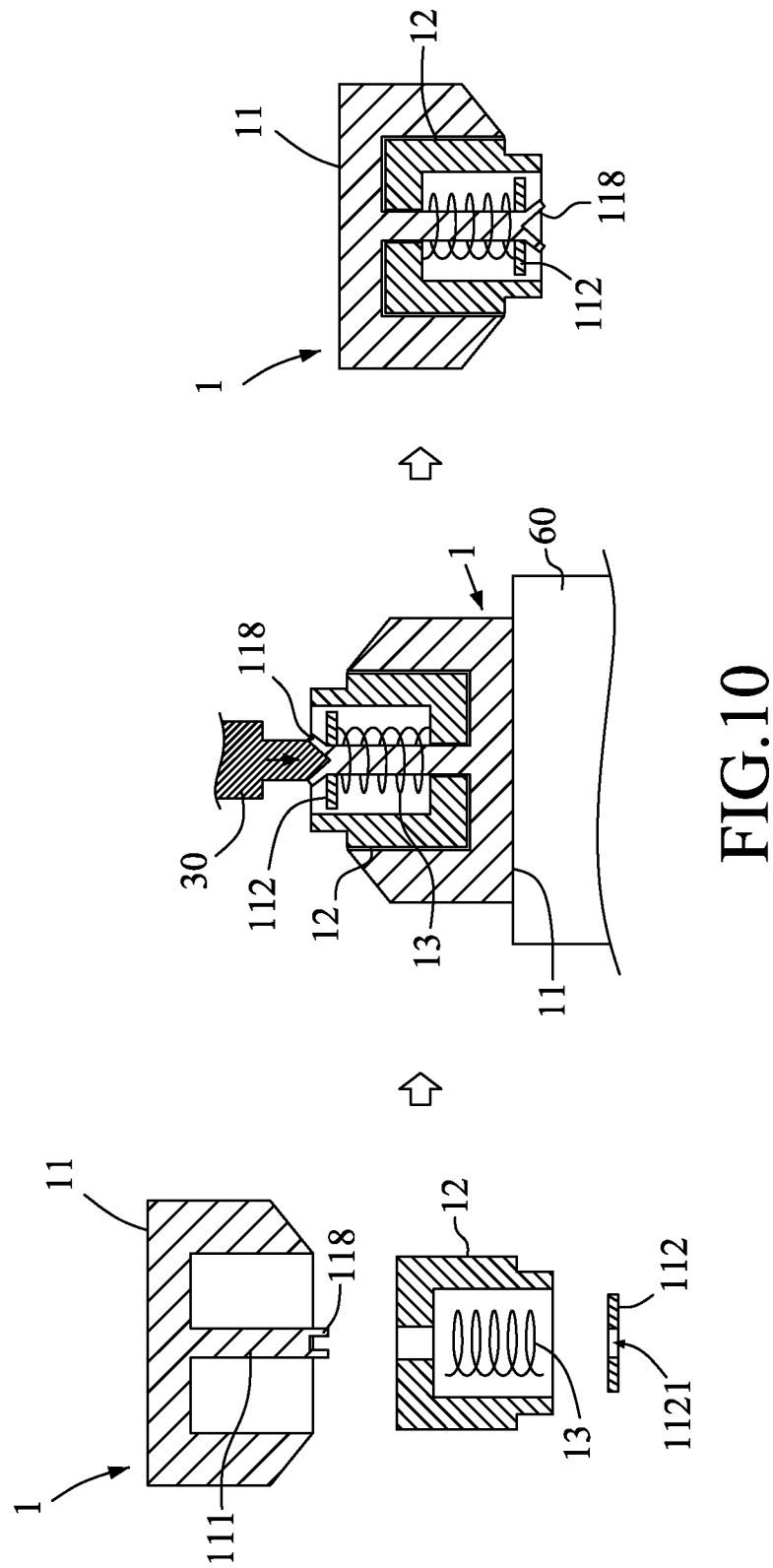
FIG. 10 shows the assembling of an eighth embodiment of the fastener structure according to the present disclosure.

Please refer to FIG. 10 that shows the assembling of an eighth embodiment of the fastener structure 1 according to the present disclosure. In the eighth embodiment, the shaft section 111 of the head portion 11 has a lower coupling section 118, via which the shaft section 111 is coupled to the press section 112. To assemble the shaft section 111 to the press section 112, first mount the elastic element 13 on around the shaft section 111 and extend the shaft section 111 through the body portion 12, and then, extend the shaft section 111 through the press section 112 or fit the press section 112 on around the shaft section 111, so that the press section 112 is preliminarily positioned on the shaft section 111. Then, put the head portion 11 upside down on a platform 60 and use a mold 30 to press against the shaft section 111, so that the lower coupling section 118 is deformed to radially outward expand. The expanded lower coupling section 118 abuts on and thereby connects the press section 112 to the shaft section 111. With this design, the fastener structure 1 according to the present disclosure can even better satisfy the requirements in actual use.

In the eighth embodiment, the press section 112 is a flat member, a column, a washer or a gasket provided with a through opening 1121. The shaft section 111 is extended through the press section 112 via the through opening 1121. After the press section 112 is assembled to the shaft section 111 due to the expanded lower coupling section 118, the elastic element 13 has one end pressed against the press section 112 and the other end against the corresponding press section 121 of the body portion 12.

Figure 11:
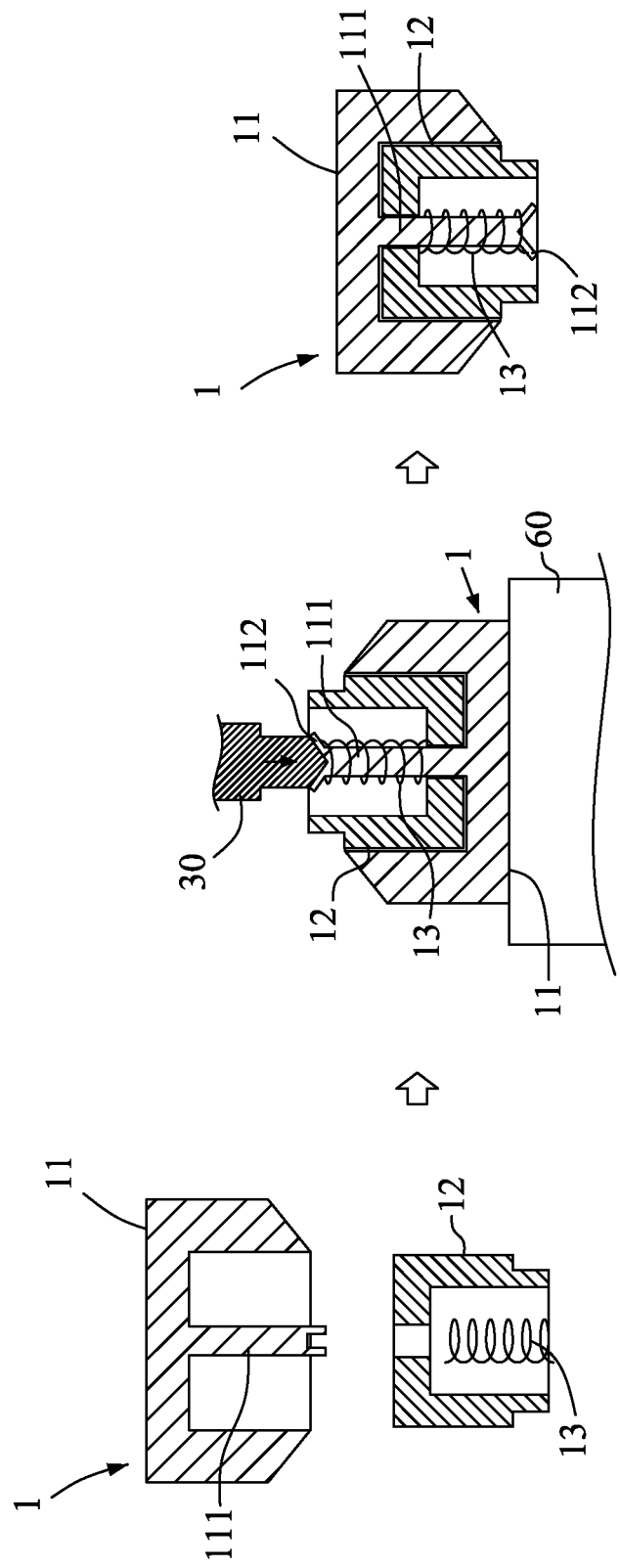
FIG. 11 shows the assembling of a ninth embodiment of the fastener structure according to the present disclosure.

Please refer to FIG. 11 that shows the assembling of a ninth embodiment of the fastener structure 1 according to the present disclosure. In the ninth embodiment, a free end of the shaft section 111 of the fastener structure 1 can be flared by driven riveting to form the press section 112 when an external force is applied to the free end. To assemble the fastener structure 1 in the ninth embodiment, first fit the elastic element 13 on around the shaft section 111 and then extend the shaft section 111 through the body portion 12, so that the head portion 11 is preliminarily assembled to the body portion 12. Then, put the head portion upside down on a platform 60 and use a mold 30 to apply a force on the free end of the shaft section 111, so that the shaft section 111 is deformed to flare out and form the press section 112. In this way, the fastener structure 1 of the present disclosure can better satisfy the requirements in actual use.

Please refer to FIGS. 12 and 13 that show the assembling of a tenth and an eleventh embodiment, respectively, of the fastener structure 1 according to the present disclosure. In these two embodiments, the shaft section 111 has a press section 112 and a lower coupling section 118. In the tenth embodiment, the shaft section 111 further has a shoulder or stepped section 119, so that the press section 112 is assembled to the shaft section 111 and limited to between the shoulder section 119 and the lower coupling section 118. In both embodiments, the press section 112 on the lower coupling section 118 is elastically movable. In this way, the fastener structure 1 of the present disclosure can better satisfy the requirements in actual use.

Please refer to FIG. 14 that is a sectional view of a twelfth embodiment of the fastener structure 1 according to the present disclosure. In the twelfth embodiment, the head portion 11 of the fastener structure 1 further internally defines a receiving section 114, in which the body portion 12 can be received to reduce an overall height of the fastener structure 1. The hold-down section 113 is externally located around the head portion 11 and has a height "a" close to that of the receiving section 114. This design also enables a reduced overall height of the fastener structure 1, making the present disclosure more practical for use.

Figure 15:
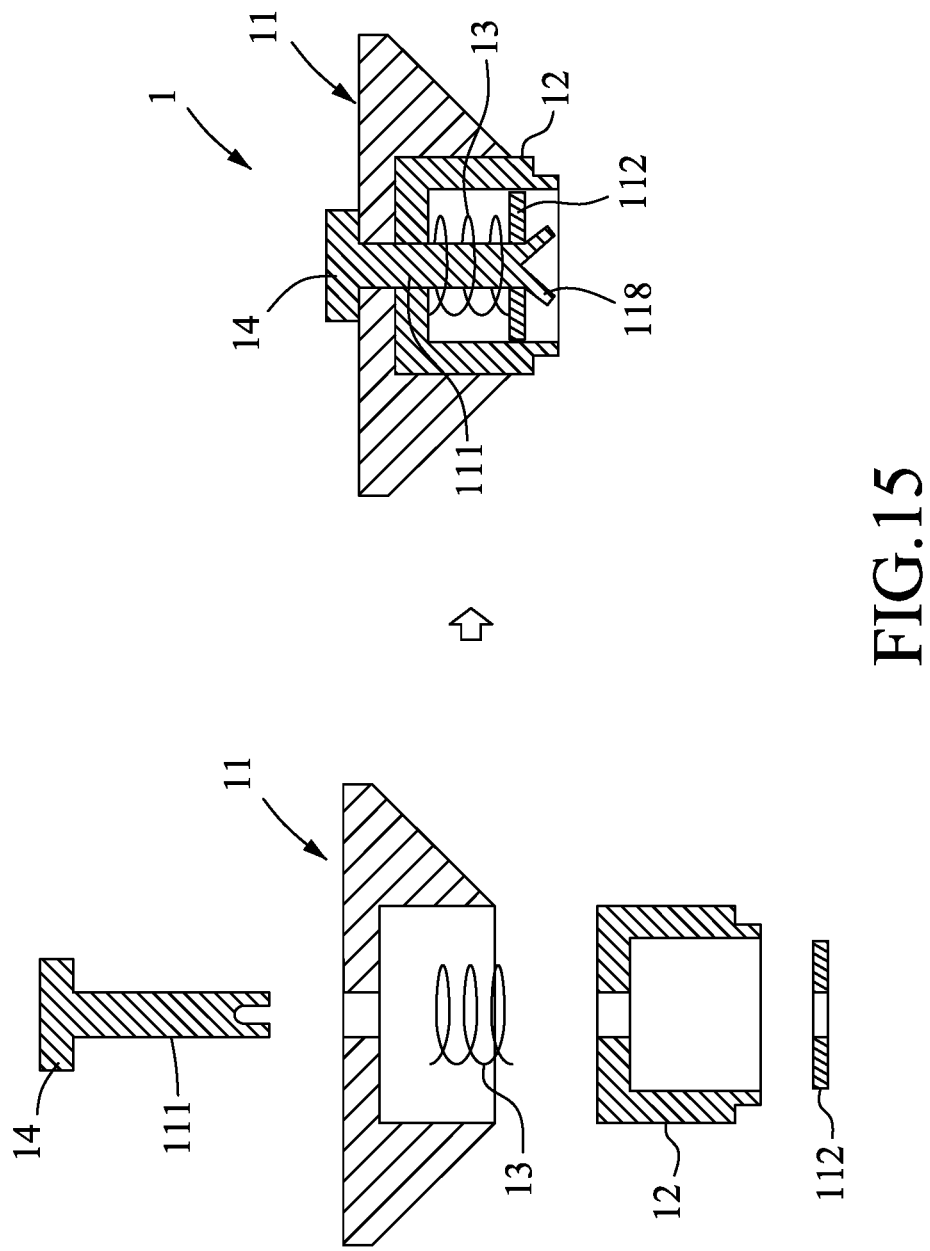
FIG. 15 shows the assembling of a thirteenth embodiment of the fastener structure according to the present disclosure.

Please refer to FIG. 15 that shows the assembling of a thirteenth embodiment of the fastener structure 1 according to the present disclosure. In the thirteenth embodiment, the shaft section 111 of the fastener structure 1 has a top press section 14. The shaft section 111 can be extended through the head portion 11 and the body portion 12 with the top press section 14 located and abutted on the head portion 11, so that the head portion 11 and the body portion 12 are preliminarily assembled together. A force can be applied by a mold (not shown in FIG. 15) to the shaft section 111 at its free end, so that the free end is deformed to form a lower coupling section 118, which is located below and upwardly abutted against the press section 112 to complete the assembling of the head portion 11 and the body portion 12. With these arrangements, the fastener structure 1 of the present disclosure can better satisfy the requirements in actual use.

Figure 16:
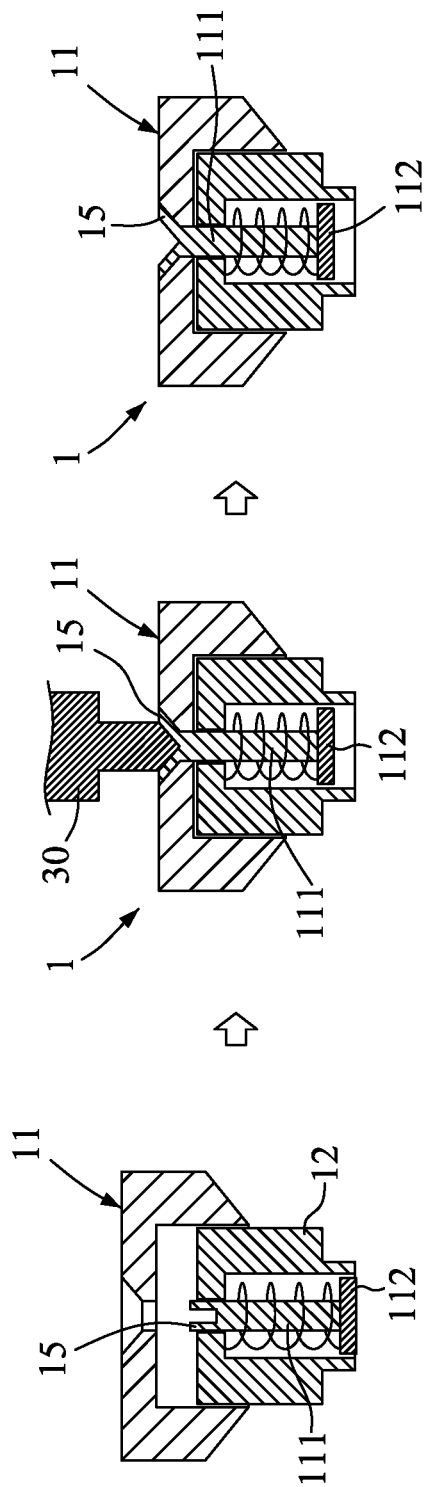
FIG. 16 shows the assembling of a fourteenth embodiment of the fastener structure according to the present disclosure.

Please refer to FIG. 16, which shows the assembling of a fourteenth embodiment of the fastener structure 1 according to the present disclosure. In the fourteenth embodiment, the press section 112 of the fastener structure 1 is integrally formed with the shaft section 111, and the shaft section 111 has a connecting section formed at its top. The connecting section 15 can be flared by driven riveting when an external force is applied thereto using a mold 30, so as to be riveted to the head portion 11.

Please refer to FIGS. 17 and 18(a)-(c). FIG. 17 is sectional view of a fifteenth embodiment of the fastener structure 1 according to the present disclosure, and FIG. 18(a)-(c) show other possible configurations for a fastening section 16 included in the shaft section 111 of the fastener structure 1 in the fifteenth embodiment. The fastening section 16 can be in the form of a straight column as shown in FIG. 17, an externally threaded stem as shown in FIG. 18(a), a male fastening element as shown in FIG. 18(b), a female fastening element as shown in FIG. 18(c), or an elastic fastening element (not shown), so that the present disclosure can be more practical for use to satisfy the requirements in different applications.

Figure 19:
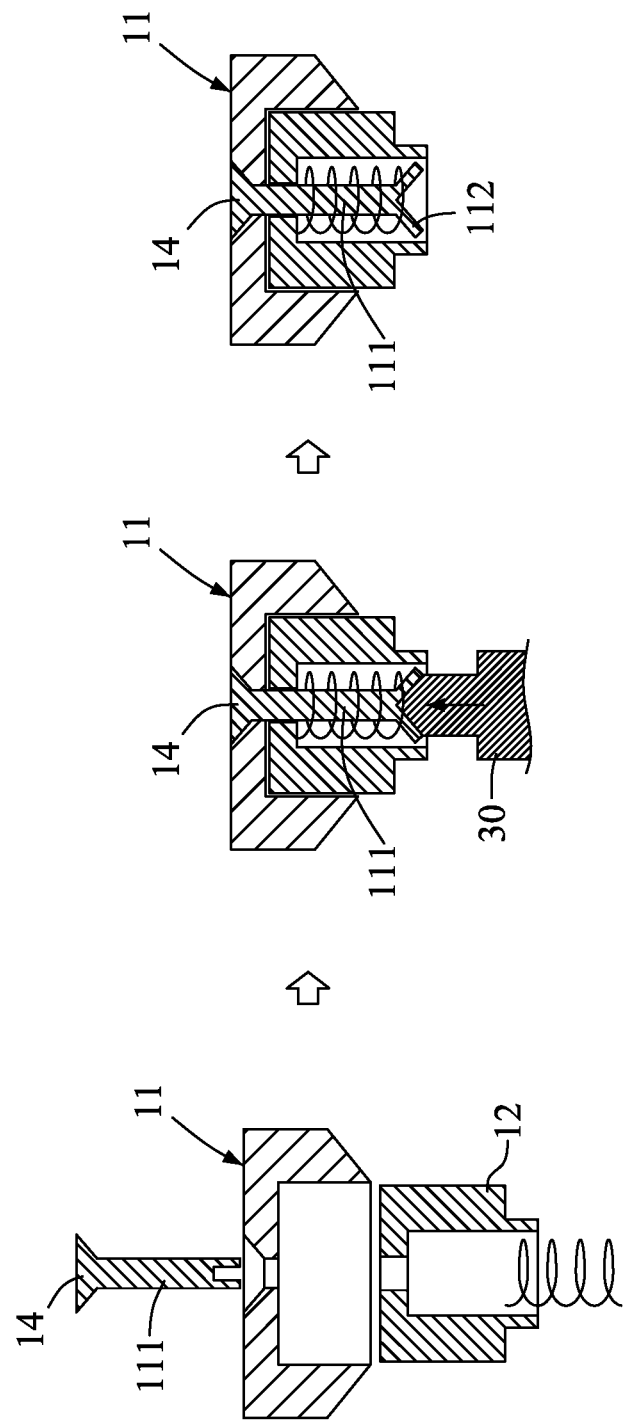
FIG. 19 shows the assembling of a sixteenth embodiment of the fastener structure according to the present disclosure.

Please refer to FIG. 19, which shows the assembling of a sixteenth embodiment of the fastener structure according to the present disclosure. In the sixteenth embodiment, the top press section 14 of the shaft section 111 has a countersunk head, and the head portion 11 has a sunken recess shaped corresponding to that of the countersunk head of the top press section 14. The countersunk head of the top press section 14 can be fitly set in the sunken recess to be flush with the top of the head portion 11, so that the head portion 11 can have a reduced overall height. Further, a mold 30 can be used to apply a force against the free end of the shaft section 111, so that the free end of the shaft section 111 is deformed and flared to form the press section 112. In this way, the fastener structure 1 of the present disclosure can be more practical for use to meet the requirements in different applications.

Figure 20:
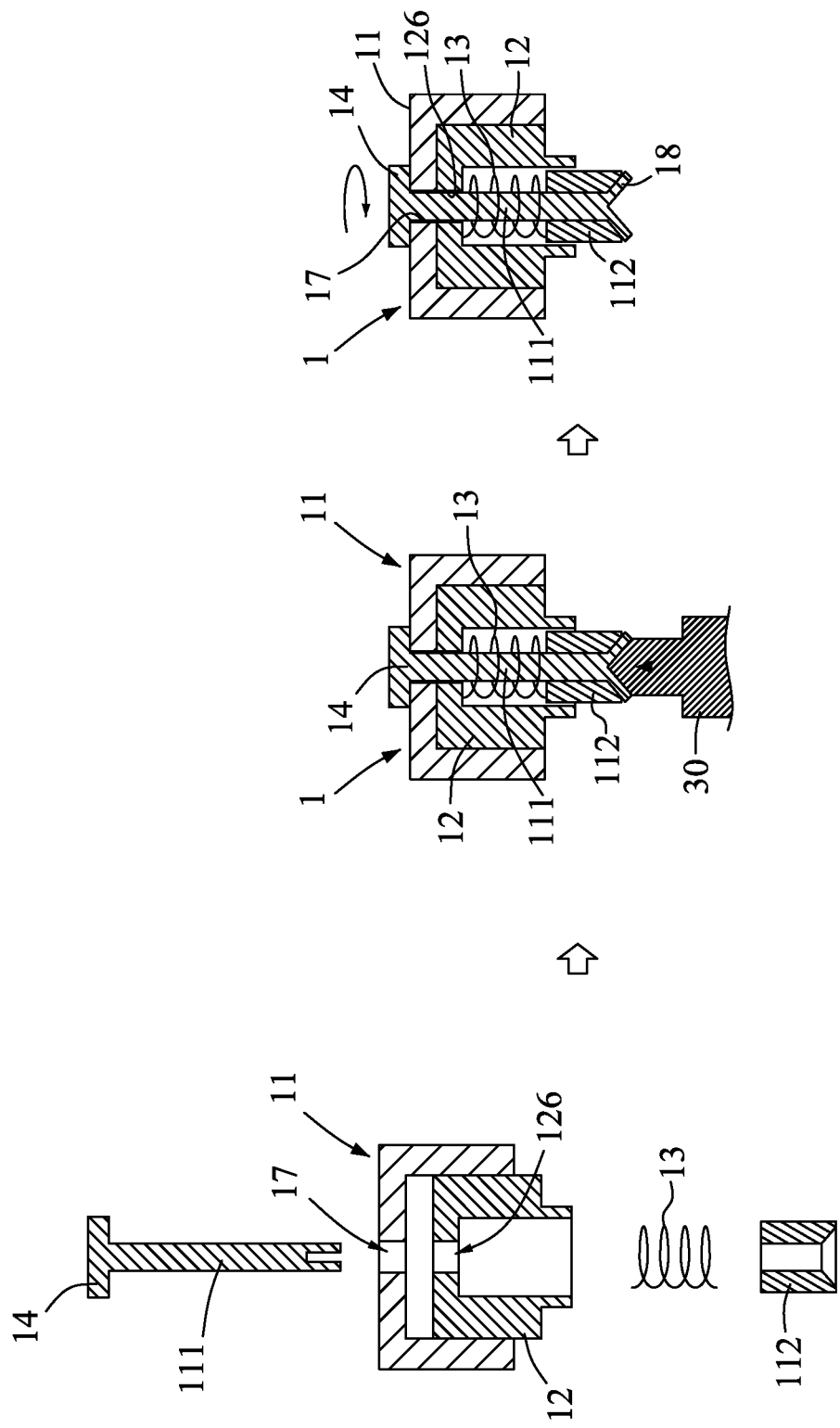
FIG. 20 shows the assembling of a seventeenth embodiment of the fastener structure according to the present disclosure.
Figure 21:
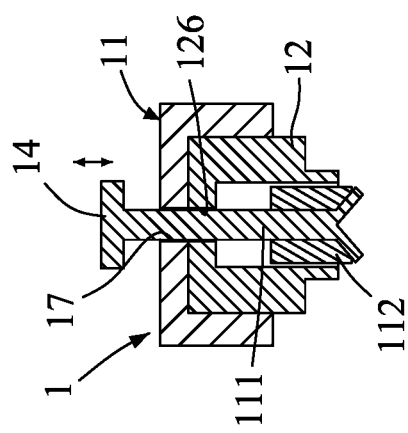
FIG. 21 is a sectional view of an eighteenth embodiment of the fastener structure according to the present disclosure.
Figure 22:
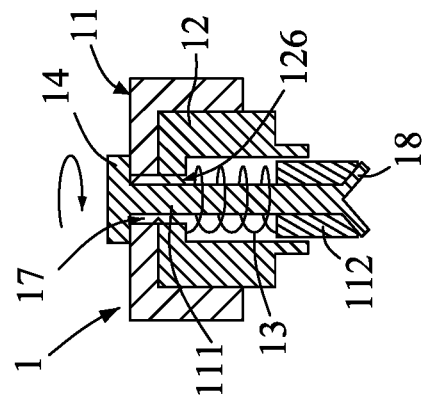
FIG. 22 is a sectional view of a nineteenth embodiment of the fastener structure according to the present disclosure.

Please refer to FIGS. 20 to 22, wherein FIG. 20 shows the assembling of a seventeenth embodiment of the fastener structure according to the present disclosure; FIG. 21 is a sectional view of an eighteenth embodiment of the fastener structure according to the present disclosure; and FIG. 22 is a sectional view of a nineteenth embodiment of the fastener structure according to the present disclosure. In these three embodiments, to assemble the head portion 11, the shaft section 111 and the body portion 12 of the fastener structure 1 to one another, first extend the shaft section 111 through the head portion 11 and the body portion 12. Then, the free end of the shaft section 111 is flared by driven riveting when a force is applied thereto using a mold 30. The flared end of the shaft section 111 forms a stop structure 18 to upward abut against the press section 112, enabling the shaft section 111 and the press section 112 to connect together, so that the elastic element 13, the head portion 11 and the body portion 12 are limited to between the top press section 14 of the shaft section 111 and the press section 112.

And, in these three embodiments, the head portion 11 is provided with a through hole 17 and the body portion 12 is also provided with a through hole 126. When assembling the head portion 11, the shaft section 111 and the body portion 12 to one another, first extend the shaft section 111 through the through hole 17 on the head portion 11 and the through hole 126 on the body portion 12, either from top to bottom or from bottom to top, such that the elastic element 13, the head portion 11 and the body portion 12 are limited to between the top press section 14 of the shaft section 111 and the press section 112. Meanwhile, the top press section 14 is abutted on the through hole 17 of the head portion 11 while the shaft section 111 is movable in the through hole 17 of the head portion 11 and the through hole 126 of the body portion 12. Therefore, the top press section 14 is movably connected to the through hole 17 to be horizontally turnable or rotatable as shown in FIG. 20, or to be upward and downward movable as shown in FIG. 21, or to be sidewardly movable as shown in FIG. 22. With these designs, the fastener structure 1 of the present disclosure can better satisfy the requirements in actual use.

Figure 23:
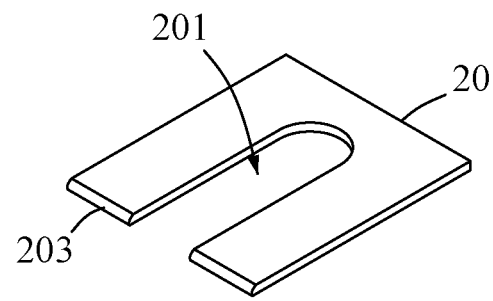
FIG. 23 is a perspective view of another workpiece that is to be fastened to an object using the fastener structure of the present disclosure.
Figure 24:
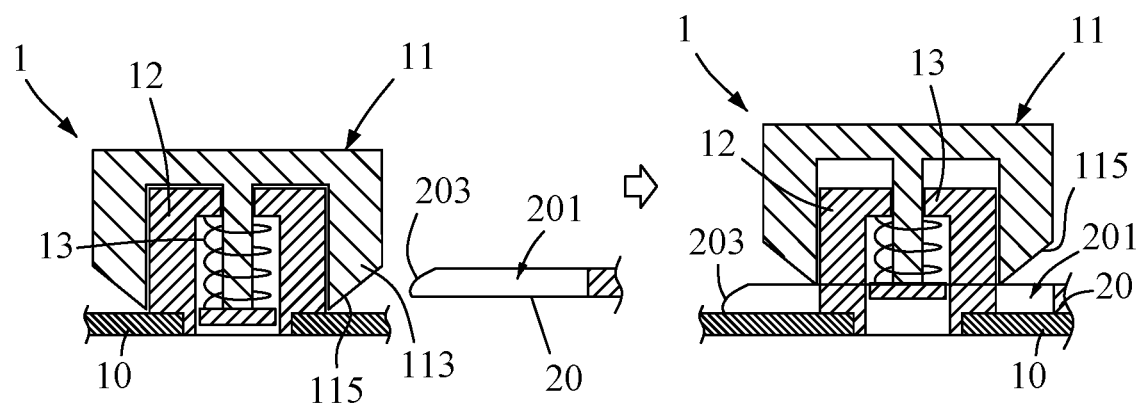
FIG. 24 shows the use of a twentieth embodiment of the fastener structure to fasten the workpiece of FIG. 23 to an object.

Please refer to FIGS. 23 and 24, wherein FIG. 23 is a perspective view of another type of workpiece 20 that is to be fastened to an object 10 using the fastener structure 1 of the present disclosure; and FIG. 24 shows the use of a twentieth embodiment of the fastener structure 1 to fasten the workpiece 20 of FIG. 23 to the object 10. As shown in FIG. 23, the workpiece 20 has a narrowed locking section 201 and a corresponding guiding section 203. The fastener structure 1 in the twentieth embodiment has a body portion 12 for engaging with the object 10 and a head portion 11 with a hold-down section 113 that can be moved onto the narrowed locking section 201 to elastically hold down on the workpiece 20 against the object 10.

To use the fastener structure 1 of the twentieth embodiment to fasten the workpiece 20 to the object 10, first push the workpiece 20 for the corresponding guiding section 203 to move toward and press against the guiding section 115 of the hold-down section 113, so that the head portion 11 is guided to the narrowed locking section 201 on the workpiece 20. At this point, the hold-down section 113 of the head portion 11 is lifted onto the narrowed locking section 201 and the elastic element 13 is compressed to firmly push against the hold-down section 113 for the same to elastically hold down the workpiece 20. In this way, at least two objects, i.e. the object 10 and the workpiece 20, are fastened together, as shown in FIG. 24.

In the twentieth embodiment, the hold-down section 113 has a width larger than that of the narrowed locking section 201 and the body portion 12 has a width smaller than that of the narrowed locking section 201, such that the hold-down section 113 is located atop of the narrowed locking section 201 to elastically hold down the workpiece 20 against the object 10 and complete the connection of at least two objects.

Figure 25:
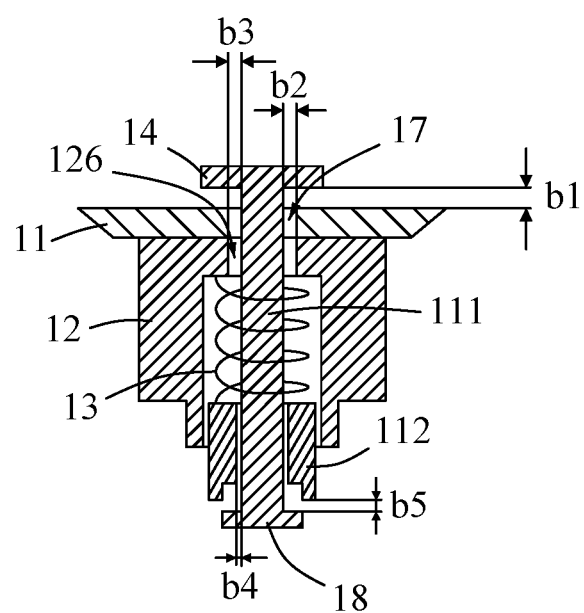
FIG. 25 shows the use of a twenty-first embodiment of the fastener structure according to the present disclosure.

Please refer to FIG. 25 that shows the use of a twenty-first embodiment of the fastener structure 1 according to the present disclosure. To assemble the head portion 11, the shaft section 111 and the body portion 12 of the fastener structure 1 in the twenty-first embodiment, first extend the shaft section 111 through the through hole 17 on the head portion 11 and the through hole 126 on the body portion 12, either from top to bottom or from bottom to top, such that the elastic element 13, the head portion 11 and the body portion 12 are limited to between the top press section 14 of the shaft section 111 and the press section 112. Meanwhile, the shaft section 111 has a stop structure 18 for upward abutting against the press section 112. Wherein, a floating space b1 is left between the top press section 14 and the head portion 11, a floating space b2 is left between the shaft section 111 and the through hole 17 on the head portion 11, a floating space b3 is left between the shaft section 111 and the through hole 126 on the body portion 12, a floating space b4 is left between the shaft section 111 and the press section 112, and a floating space b5 is left between the press section 112 and the stop structure 18 of the shaft section 111. With these arrangements, the fastener structure 1 can meet any movement requirement when fastening the objects.

In the twenty-first embodiment, the floating spaces b1, b2, b3, b4 and b5 can be ranged between 0.00001 mm and 100 mm, so that the present disclosure is more practical for use in different applications.

In conclusion, the present disclosure provides a fastener structure, which includes a body portion for engaging with an object and a head portion having a hold-down section that can elastically hold down a workpiece against the object and be elastically removed from the workpiece, so that at least two objects can be connected to and disconnected from one another in a quick and repeatable manner.

While the present disclosure has been described by means of specific embodiments, numerous modifications and variations could be made thereto by those skilled in the art without departing from the scope and spirit of the present disclosure set forth in the claims.

What is claimed is:

1. A fastener structure, comprising:
   a head portion having a shaft section, a press section and a hold-down section;
   a body portion having a corresponding press section; and the corresponding press section being movably assembled to the press section; and
   an elastic element having an end pressed against the press section and another end pressed against the body portion, allowing the head portion to move elastically;
      characterized in that the hold-down section has a width larger than that of a narrowed locking section on a workpiece and the body portion has a width smaller than that of the narrowed locking section, such that the body portion can be moved through the narrowed locking section to extend downward, while the hold-down section is elastically moved onto the narrowed locking section and then into an expanded locking section of the workpiece located directly behind the narrowed locking section to thereby elastically hold down the workpiece.

2. The fastener structure according to claim 1, characterized in that the head portion internally defines a receiving section, and that the body portion is received in the receiving section to reduce an overall height of the fastener structure.

3. The fastener structure according to claim 1, characterized in that the hold-down section has a guiding section for guiding or pushing the head portion to the narrowed locking section on the workpiece.

4. The fastener structure according to claim 1, characterized in that the hold-down section is provided with a guiding section, which can be moved to while apply a force against an expanded or the narrowed locking section on the workpiece, so that the head portion is lifted to separate from the expanded or the narrowed locking section and can be then easily moved to a top of the narrowed locking section or be detached from the workpiece, respectively.

5. The fastener structure according to claim 1, characterized in that the elastic element has one end pressed against the press section and another end pressed against the corresponding press section of the body portion, such that the elastic movement of the head portion brings the shaft section to elastically move in the body portion.

6. The fastener structure according to claim 1, characterized in that the shaft section has a top press section with a countersunk head and the head portion has a sunken recess shaped corresponding to that of the countersunk head of the top press section, such that the countersunk head of the top press section can be fitly set in the sunken recess to reduce an overall height of the head portion.

7. The fastener structure according to claim 1, characterized in that the shaft section has a top press section and the head portion is provided with a through hole, and that the top press section is limited to the through hole while the shaft section is turnable, rotatable, upward and downward movable, or sidewardly movable in the through hole.

8. The fastener structure according to claim 1, characterized in that the shaft section has a top press section and the head portion has a through hole, and that the top press section is limited to the through hole while the shaft section is movable in the through hole.

9. The fastener structure according to claim 1, characterized in that the head portion, the shaft section and the body portion are assembled to one another by extending the shaft section through the head portion and the body portion, either from top to bottom or from bottom to top, so that the elastic element, the head portion and the body portion are limited to between a top press section and the press section of the shaft section.

10. The fastener structure according to claim 1, characterized in that the head portion, the shaft section and the body portion are assembled to one another by extending the shaft section through a through hole formed on the head portion and a through hole formed on the body portion, so that the elastic element, the head portion and the body portion are limited to between a top press section and the press section of the shaft section.

11. The fastener structure according to claim 1, characterized in that the head portion, the shaft section and the body portion are assembled to one another by extending the shaft section through a through hole formed on the head portion and a through hole formed on the body portion, so that the elastic element, the head portion and the body portion are limited to between a top press section and the press section of the shaft section; and that the top press section is limited to the through hole of the head portion while the shaft section is turnable, rotatable, upward and downward movable, or sidewardly movable in the through hole of the head portion and the through hole of the body portion.

12. The fastener structure according to claim 1, characterized in that the head portion, the shaft section and the body portion are assembled to one another by extending the shaft section through a through hole formed on the head portion and a through hole formed on the body portion, either from top to bottom or from bottom to top, so that the elastic element, the head portion and the body portion are limited to between a top press section and the press section of the shaft section; and that the top press section is limited to the through hole of the head portion while the shaft section is movable in the through hole of the head portion and the through hole of the body portion.

13. The fastener structure according to claim 1, characterized in that the head portion, the shaft section and the body portion are assembled to one another by extending the shaft section through a through hole formed on the head portion and a through hole formed on the body portion, so that the elastic element, the head portion and the body portion are limited to between a top press section and the press section of the shaft section; and that a first floating space is left between the top press section and the head portion, a second floating space is left between the shaft section and the through hole of the head portion, a third floating space is left between the shaft section and the through hole of the body portion, a fourth floating space is left between the shaft section and the press section, or a fifth floating space is left between the press section and the top press section of the shaft section.

14. The fastener structure according to claim 1, characterized in that the hold-down section has a guiding section; and the guiding section being able to apply a force against the workpiece to thereby lift the head portion for the same to move onto the narrowed locking section formed on the workpiece.

15. The fastener structure according to claim 1, characterized in that the body portion has an engaging section being provided with a weldable layer; and that the fastener structure is picked up from a carrier and placed on an object by a tool, and the weldable layer is welded to the object to thereby connect the body portion to the object.

16. A fastener structure, comprising:

a head portion having a shaft section, a press section and a hold-down section;

a body portion having a corresponding press section; and the corresponding press section being movably assembled to the press section; and an elastic element having an end pressed against the press section and another end pressed against the body portion, allowing the head portion to move elastically;

characterized in that the head portion internally defines a receiving section and the body portion is received in the receiving section to reduce an overall height of the fastener structure; and that the hold-down section is externally located around the head portion and has a height close to that of the receiving section to also reduce the overall height of the fastener structure.

* * * * *